INVENTORS.
ROBERT L. SCHALLER.
GEORGE R. KUNZELMAN.
BY D. Emmett Thompson.
ATTORNEY.

Dec. 15, 1970  R. L. SCHALLER ET AL  3,546,817
TURBINE ROTOR GRINDING MACHINE
Filed July 18, 1968  5 Sheets-Sheet 5

INVENTORS.
ROBERT L. SCHALLER.
GEORGE R. KUNZELMAN.
BY
D. Emmett Thompson
ATTORNEY.

United States Patent Office 3,546,817
Patented Dec. 15, 1970

3,546,817
TURBINE ROTOR GRINDING MACHINE
Robert L. Schaller, Camillus, and George R. Kunzelman, Syracuse, N.Y., assignors to Sundstard-Engelberg, Inc., a corporation of Delaware
Filed July 18, 1968, Ser. No. 745,786
Int. Cl. B24b 5/00, 21/02, 29/00
U.S. Cl. 51—49                               11 Claims

ABSTRACT OF THE DISCLOSURE

A machine for grinding the tips of the blades of a turbine rotor including rotors wherein the blades are mounted in the hub of the rotor so as to have limited radial movement. The rotor is rotated at a speed sufficient to maintain the blades in outermost position by centrifugal force during the grinding operation, which position the blades assume during actual operation of the turbine. The machine includes a grinding head movable along a path in a direction lengthwise of the rotor, the path being adjustable into and out of parallelism with the axis of the rotor. The grinding head is movable toward and from the rotor, and also about a vertical axis. All movements of the grinding head are effected by power means, and may occur simultaneously.

BACKGROUND OF THE INVENTION

At present, the tip portions of the blades of turbine rotors are ground by machines constructed to finish rotors for turbines of relatively small dimension. Such machines do not embody a structural arrangement capable of functioning to finish grinding rotors of various dimensions and configurations. Conventionally, the turbine grinding machine is a special machine constructed to grind a rotor embodying a specific structure and form.

BRIEF SUMMARY OF THE INVENTION

The machine of our invention embodies a structural arrangement capable of grinding turbine rotors of all sizes and configurations. Provision is made for rotating the rotor at a speed comparable to the speed at which the turbine will be operated. The machine is provided with power means for effecting movement of the grinding head relative to the rotor, such movements being linear and the head may be moved by the power means simultaneously over a plurality of paths, whereby rotors involving different configurations may be ground.

DETAILED DESCRIPTION

Figure 1:
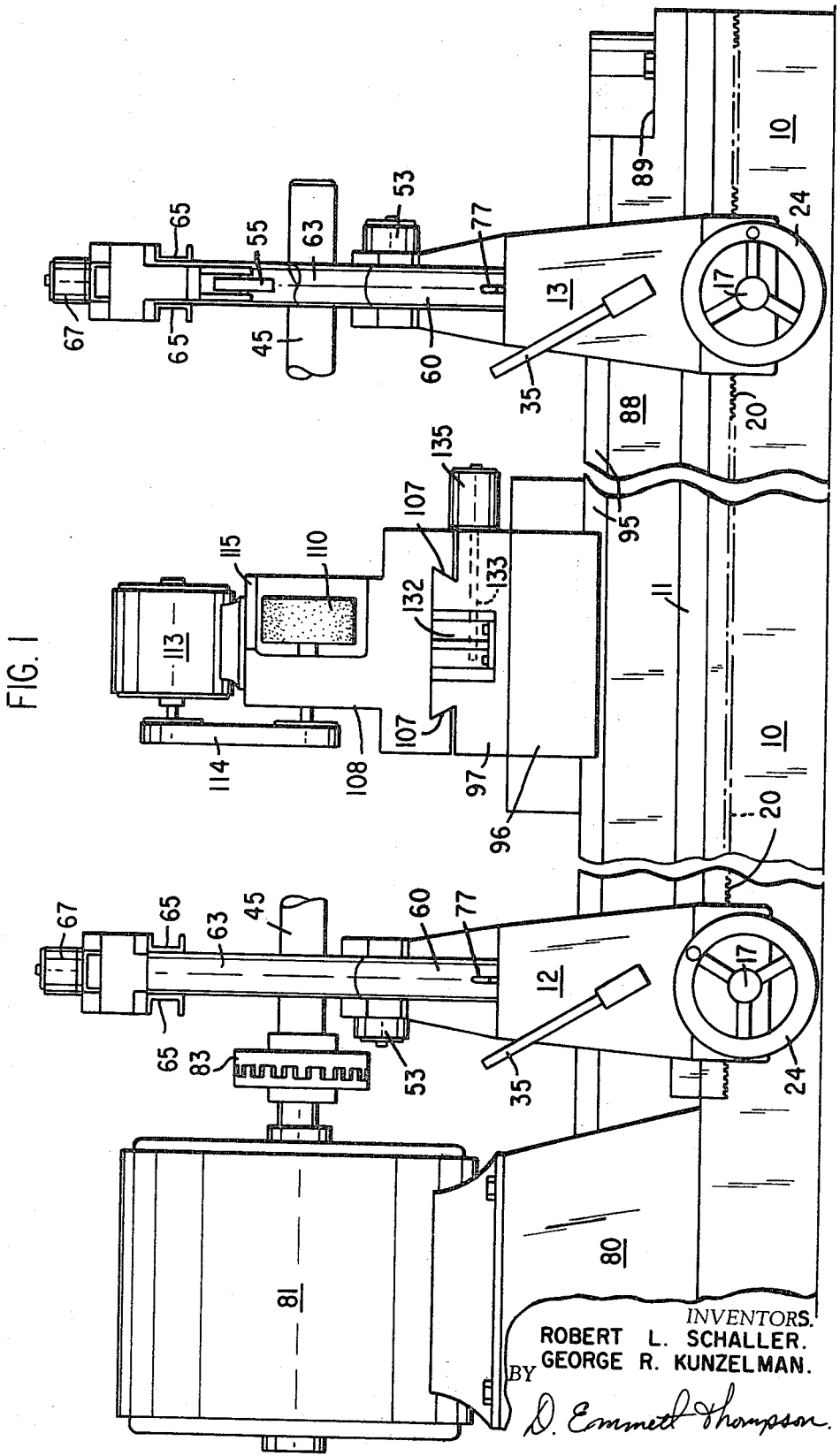
FIG. 1 is a side elevational view of a grinding machine embodying our invention.

The machine is provided with a base 10 formed with a pair of ways 11 extending lengthwise of the base in parallel relation. Columns 12, 13, are mounted for sliding movement along the ways 11. These columns are, in general, of box form having a depending front flange 15 in which is journalled a shaft 17. A pinion gear 18 is fixed to the inner end of each shaft 17 and is arranged to mesh with a gear rack 20 fixed to the under side of a lateral flange 23 formed on the base 10. A hand wheel 24 is fixed to the outer end of each shaft 17. Upon rotation of the hand wheels, the columns 12, 13, are moved along the ways 11 to accommodate rotors of different length.

Figure 2:
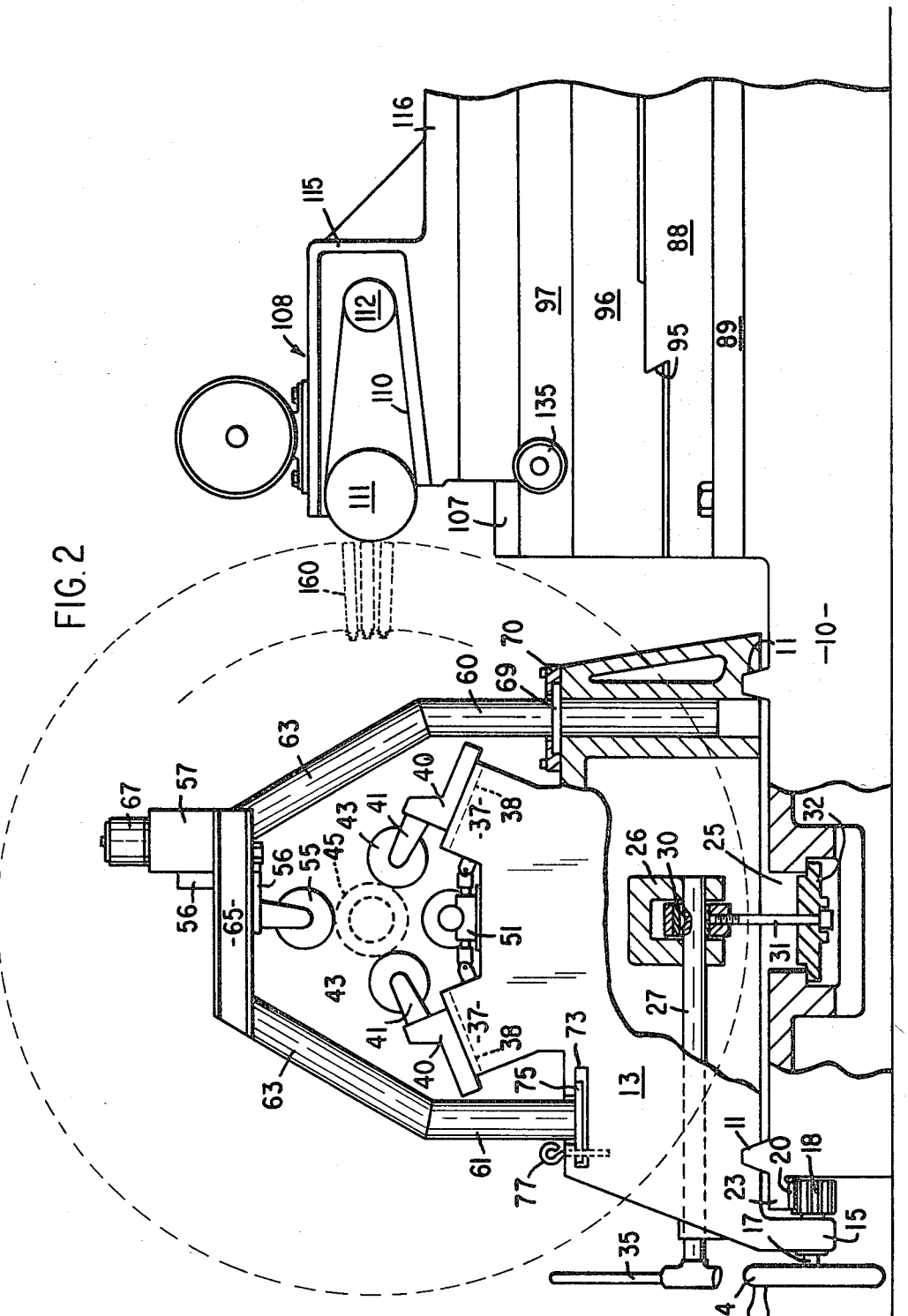
FIG. 2 is an end elevational view of the machine, looking to the left of FIG. 1, with a portion of the rotor supporting structure broken away, and with parts in section.
Figure 5:
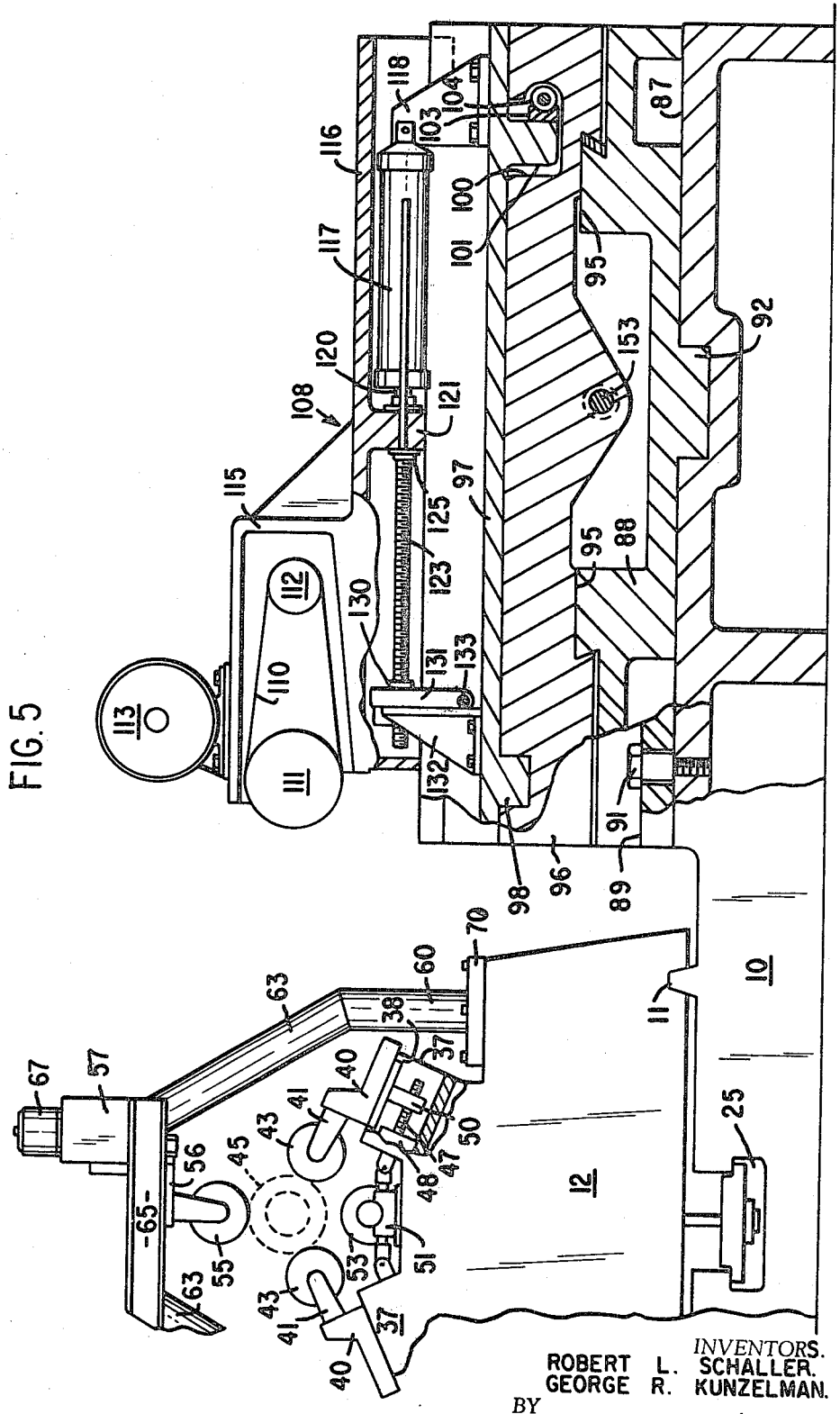
FIG. 5 is a partial end elevation of the rotor supporting structure and a transverse sectional view of the grinding head and supporting structure taken on line 5—5, FIG. 4.

The base 10 is formed with a T slot 25 extending medial of the ways 11. The columns 12, 13, are of box formation and have webs 26 extending between the end walls of the columns. A shaft 27 is journalled in the front wall of each column, and the inner ends of the shafts are journalled in the webs 26, see FIG. 2. A cam 30 is keyed to each shaft and serves, upon oscillation of the shafts, to impart vertical movement to rods 31. A cross member 32 is carried by each of the rods and is arranged in the T slot 25. An operating handle 35 is fixed to the outer end of each of the shafts 27. With this arrangement, the columns 12, 13, are fixedly clamped on the ways when adjusted therealong by rotation of the hand wheels 24. The columns 12, 13, serve to support the turbine rotor during the grinding operation. The top surface of each column is formed with a pair of extensions 37 formed with inclined ways 38 to slidably receive brackets 40 provided with a bifurcated arm structure 41 in which are journalled rollers 43 for engagement by the turbine shaft 45, see FIGS. 2 and 5.

The brackets 40 are moved along the ways 38 by screws 47 journalled in brackets 48 fixed to the columns. The screws thread into lugs 50 depending from the brackets 40. The screws 47 are connected to a worm gear reducing unit 51 operated by a motor 53. The rollers 43 are moved toward and from the axis of the rotor shaft 45 in unison by the motor 53 to accommodate rotor shafts of different diameters and maintaining the rotor shafts of different diameters on a preselected axis.

The rotor shafts 45 may be maintained in engagement with the rollers 43 by a top roller 55 carried by a bracket 56 having vertical sliding movement in a block 57. This structure is supported on an inverted U frame, which consists of uprights 60, 61, to the upper ends of which are attached inclined braces 63. Channel cross members 65 are attached to the upper ends of the braces 63. The blocks 57 are fixed to the cross members 65. The brackets 56 extend downwardly between the cross members 65 and are adjusted vertically by a screw arrangement similar to that used in conjunction with the brackets 40, the screw being operated by a motor 67.

Figure 3:
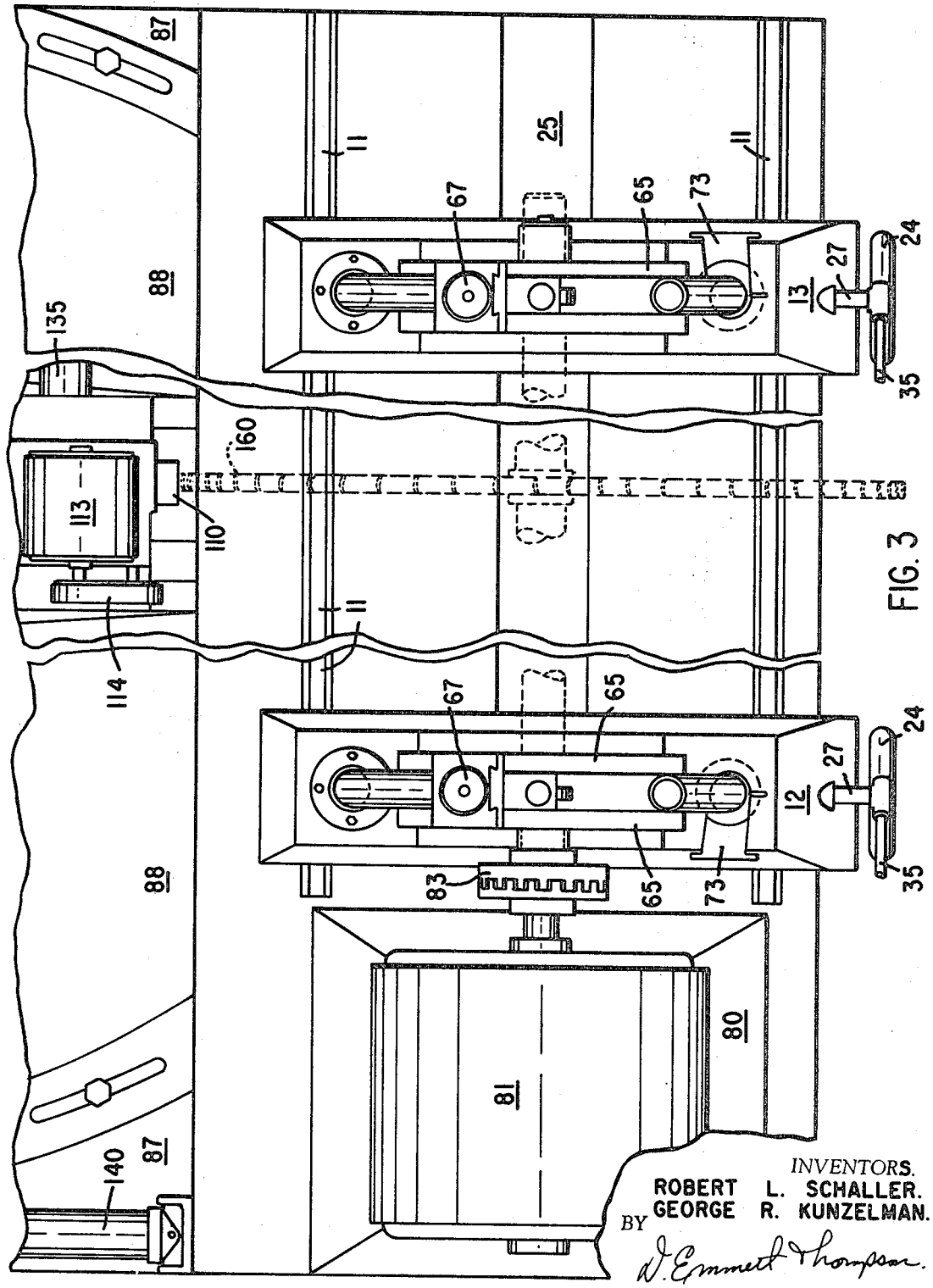
FIG. 3 is a top plan view of the rotor supporting structure and a contiguous portion of the grinding head and its supporting structure.

The uprights 60 extend downwardly into circular bores formed in the columns 12, 13, and are journalled for rotation therein. The uprights are provided with circular flanges 69. The members 60 are restrained against upward movement by a recessed collar 70 attached to the column 13, see FIG. 2. The top surfaces of the columns 12, 13, are formed at the forward side of the columns with arcuate T slots 73, see FIG. 3. A radial flange 75 is fixed to the lower end of each of the uprights 61 for movement into and out of the T slots 73. As shown in FIG. 3, the T slot in the column 12 opens to the left, and the T slot 73 in column 13 opens to the right. This permits the overhead structure supporting the upper rolls 55 to be swung laterally about the axis of the uprights 60 to permit insertion and removal of the turbine rotor from the rolls 43. When the supporting structures for the upper rolls 55 are swung into operative position, they are so retained by pins 77.

There is a third column 80 mounted on the base for supporting a motor 81 operatively connected to the rotor shaft 45 by a flexible coupling 83. The motor 81 effects rotation of the turbine rotor during the grinding operation.

Inwardly of the ways 11, the base 10 is formed with a flat surface 87, on which is mounted a sub-base 88. The sub-base 88 is found at its ends with arcuate surfaces 89 of reduced thickness. The end surfaces 89 are formed with arcuate slots 90 to receive shoulder cap screws 91, see FIGS. 4 and 5. The sub-base is formed at its center with a circular boss 92 journalled in a recess in base 10. With this arrangement, the sub-base 88 is adjustable relative to the base 10 about a vertical axis. The sub-base 88 is formed with ways 95 extending in a direction lengthwise of the ways 11.

A grinding head support structure is slidably mounted on the ways 95, this structure including a member 96 on which is mounted an intermediate member 97. This intermediate member is formed with a depending circular boss 98 positioned in a circular aperture formed in the member 96 to provide for adjustment of the intermediate member 97 about the axis of the circular boss 98. The member 96 is formed in its upper side with an arcuate slot 100 to receive a lug 101 depending from the rear end portion of the intermediate plate 97. A worm wheel segment 103 is fixed to the lug 101 and is engaged by a worm 104 fixed on a shaft 105 and powered by a reversible motor 106.

The intermediate plate 97 is formed with ways 107 on which a grinding head assembly, designated generally 108, is slidably mounted. The grinding head 108 is of the type employing an abrasive belt as the grinding element. The abrasive belt is indicated at 110 and is trained about a power driven contact wheel 111 and about an idler wheel 112. The contact wheel 111 is powered by a motor 113 and belt 114. The wheels 111, 112, and the motor 113 are mounted in a housing 115 having a rearwardly extend portion 116. The grinding head is moved toward the axis of the rotor by a piston rod in cylinder 117, FIG. 5. The rear end of the cylinder is connected to a bracket 118 fixed to the intermediate member 97. The piston rod 120 is connected to a boss 121 depending from the rear portion 116 of the grinding head housing. Forward movement of the grinding head is limited by a precision stop screw 123 provided at its inner end with a stop collar 125, the screw having a turned extension extending through the boss 121 at one side of the connection of the piston rod 120 with the boss.

A nut 130 for screw 123 is journalled in a worm gear housing 131 carried by a bracket 132 also affixed to the intermediate member 97. The worm shaft 133 is connected to a reversible motor 135. Upon rotation of the nut 130 in one direction, the stop screw 123 is moved toward the turbine rotor and the grinding head assembly is maintained against the stop collar 125 by the piston mounted in cylinder 117. Accordingly, the grinding head is movable by motor 106 about the axis of the boss 98 and the grinding head is moved toward the turbine rotor by cylinder 117.

Figure 4:
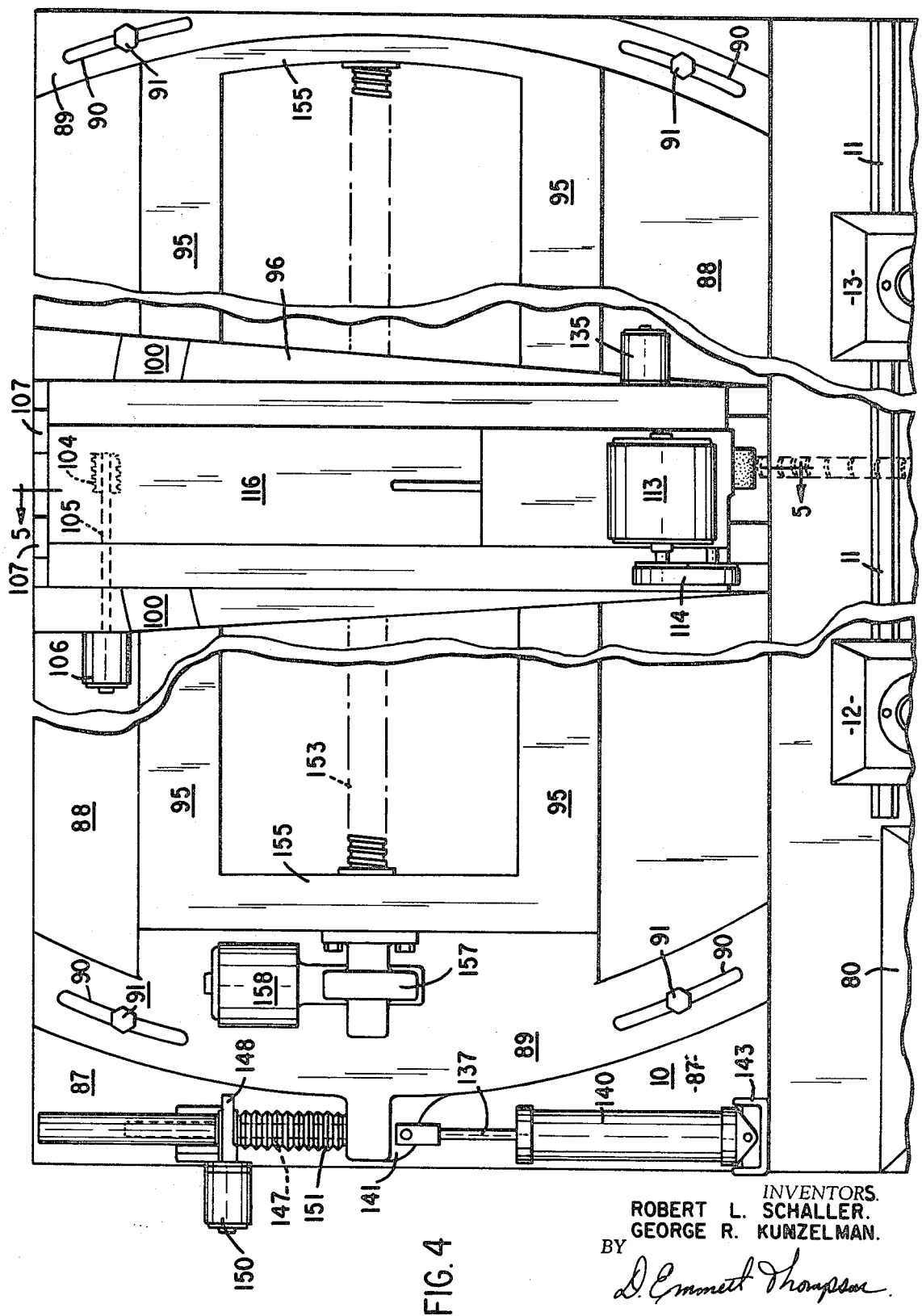
FIG. 4 is a top plan view of the grinding head and the supporting structure therefor.

The sub-base 88 is moved about the vertical axis of the boss 92 by piston rod 137 operating in cylinder 140, FIG. 4. The piston rod is connected to a lug 141 extending from the end portion 89 of the sub-base. The cylinder 140 is connected to a bracket 143 mounted on the base 10. Movement of the sub-base 88 in a clockwise direction, FIG. 4, is limited by a precision stop screw 147, the actuating nut for which is mounted in a worm gear housing 148, the worm gear being powered by motor 150. The exposed portion of the screw is covered by a collapsible boot 151. The member 96 is moved along the ways 95 by a screw 153 journalled at its ends in portions 155 extending transversely between the ways 95. A worm wheel mounted in a worm gear housing 157 is fixed to the screw 153 and is driven by a reversible motor 158.

In operation, the shaft journals 45 of the turbine rotor are positioned in the properly adjusted rolls 43. The rolls 55, if used, are moved into engagement with the journals. The grinding head is moved to one end of the ways 95. The motor 81 is energized and operated at the proper speed to maintain the blades of the series being ground in outermost position. The head is moved toward the rotor. The extent of this movement is determined by the setting of the stop screw 123 for proper grinding of the tips of the blades 160 in the first circular row, or series, of blades. One such series is shown in dotted line in FIG. 3. The abrasive belt is maintained in grinding engagement with the blade tips under pressure by the cylinder 117 which is powered by a variable pneumatic pressure. This pressure may be varied but will always be less than the centrifugal force required to keep the rotor blades in outermost position in their sockets. The grinding head is moved along the ways 95 by screw 153 for grinding the blades of each series. As the grinding head is thus moved along the ways 95, it is moved toward and from the rotor to grind the blades of each series to a precision dimension.

During the grinding operation, the sub-base 88 may be adjusted about the boss 92 to produce a tapered configuration to the blade tips. By simultaneous operation of the motor 158 actuating lead screw 153, motor 106 for shifting the intermediate member 97 about its pivot boss 98 and motor 135 for adjusting the stop screw 123, and motor 150 for adjusting stop screw 147, or the simultaneous operation of two or more of said motors, the blade tips can be precision ground to any desired configuration. These motors may be of the servo type individually dial controlled with position read out mechanism, or collectively controlled, as by tape mechanism.

Preferably, the motor 113 is of the reversible variable speed type to provide greater flexibility in respect to obtaining the most desirable surface grinding speed regardless of rotor diameter which may vary greatly from one series of blades to another in the same rotor.

What we claim is:

1. A machine for grinding the tips of the blades of a turbine rotor which consists of a shaft, a hub fixed to the shaft, blades extending radially from said hub and having limited outward radial movement relative thereto, said machine comprising a main base, rotor supporting means mounted on said base for supporting said rotor for rotation about the axis of said rotor shaft, rotor power means operatively connected to said rotor shaft for effecting rotation of the rotor at a speed sufficient to maintain said blades in outermost position by centrifugal force, a sub-base mounted on said main base and having ways extending in a direction lengthwise of said rotor shaft, a grinding head support structure mounted for sliding movement along said ways and being provided with ways extending in a direction perpendicular to the axis of said rotor shaft, a grinding head mounted on said support structure and including a grinding element and a motor for operating said element, said grinding head being slidable along the ways on said support structure to move said grinding element into and out of engagement with the tips of the rotor blade, and power means operatively connected to said grinding head to move the same on said support structure into grinding engagement with said blade tips and maintain such engagement under a predetermined pressure less than the centrifugal force maintaining said blades in outermost position.

2. A grinding machine as defined in claim 1, wherein said sub-base is adjustable about a vertical axis to move the ways of said sub-base into and out of parallelism with said rotor shaft.

3. A grinding machine as defined in claim 1, wherein said grinding head support structure includes a member slidably engaging the ways on said sub-base, and a second member intermediate said first member and said grinding head and being adjustable about a vertical axis to move the ways on said grinding head support structure in angular relation to the axis of said rotor shaft.

4. A grinding machine as defined in claim 1 and including a stop member carried by said support structure and adjustable to limit the extent of movement of said grinding head toward said rotor, and power means for adjusting said stop member.

5. A grinding machine as defined in claim 1, wherein said rotor supporting means is adjustable on said main base to accommodate rotors of different lengths.

6. A grinding machine as defined in claim 1, where said rotor supporting means includes members adjustable to support rotor shafts of different diameters on a preselected axis.

7. A grinding machine as defined in claim 1, wherein said rotor power means is a variable speed power means.

8. A grinding machine as defined in claim 1, wherein said motor for operating said grinding element is reversible.

9. A grinding machine as defined in claim 1, wherein said motor for operating said grinding element is of the variable speed type.

10. A grinding machine for grinding the tips of the blades of a turbine rotor which consists of a shaft, a hub fixed to the shaft, blades extending radially from said hub and having limited outward radial movement relative thereto, said machine comprising a main base provided with ways, a column mounted on said base, a second column movable along said ways toward and from said first column, means carried at the top of each column for supporting said rotor for rotation about the axis of said rotor shaft, variable speed rotor power means operatively connected to said rotor shaft for effecting rotation of the rotor at a speed sufficient to maintain the blades of the rotor in outermost position by centrifugal force, a sub-base mounted on said main base and having ways extending in a direction lengthwise of said rotor shaft, said sub-base being adjustable about a vertical axis to move said ways into and out of parallelism with said rotor shaft, a grinding head supporting structure including a first member mounted for sliding movement along said ways, reversible power means for effecting such movement, an intermediate member mounted on said first member and being provided with ways extending toward the axis of said rotor, said intermediate member being mounted for adjustment about a vertical axis to move the ways thereof into angular relation to the axis of said rotor, a grinding head mounted on said intermediate member for movement along the ways thereof toward and from said rotor, said grinding head including a grinding element and a motor for operating said element, power means operatively connected to said grinding head to move the same on said intermediate member to move said grinding element into grinding engagement with the tips of the rotor blades and maintain such engagement under a predetermined pressure less than the centrifugal force maintaining said blades in outermost position.

11. A machine as set forth in claim 10 and including reversible power means for adjusting said sub-base about the vertical axis mounting therefor, and reversible power means for adjusting said intermediate member about the vertical axis mounting therefor.

References Cited

UNITED STATES PATENTS

| | | | |
|---|---|---|---|
| 2,197,077 | 4/1940 | Littlefield | 51—145X |
| 2,710,495 | 6/1955 | Green | 51—165.03X |
| 3,479,772 | 11/1969 | Yoder | 51—145 |

JAMES L. JONES, JR., Primary Examiner

U.S. Cl. X.R.

51—145